United States Patent
Gladkov

(10) Patent No.: US 6,836,087 B2
(45) Date of Patent: Dec. 28, 2004

(54) MULTIPHASE MOTOR VOLTAGE CONTROL FOR PHASE WINDINGS OF DIFFERENT WIRE GAUGES AND WINDING TURNS

(75) Inventor: Alexander A. Gladkov, Fairfax, VA (US)

(73) Assignee: Wavecrest Laboratories, LLC, Dulles, VA (US)

(*) Notice: Subject to any disclaimer, the term of this patent is extended or adjusted under 35 U.S.C. 154(b) by 0 days.

(21) Appl. No.: 10/352,896

(22) Filed: Jan. 29, 2003

(65) Prior Publication Data

US 2004/0145326 A1 Jul. 29, 2004

(51) Int. Cl.[7] .................................................. H02P 5/00
(52) U.S. Cl. ....................... 318/268; 318/269; 318/270; 318/271
(58) Field of Search ............................... 318/268, 269, 318/270, 271, 251, 252

(56) References Cited

U.S. PATENT DOCUMENTS

| | | | | |
|---|---|---|---|---|
| 4,282,472 A | * | 8/1981 | Martin | 318/696 |
| 5,084,662 A | * | 1/1992 | Palaniappan et al. | 318/701 |
| 5,260,635 A | * | 11/1993 | Bahn | 318/701 |
| 5,457,374 A | * | 10/1995 | Branecky et al. | 318/801 |
| 5,459,385 A | * | 10/1995 | Lipo et al. | 318/701 |
| 5,489,831 A | * | 2/1996 | Harris | 318/701 |
| 5,861,727 A | * | 1/1999 | Blackburn et al. | 318/701 |
| 6,493,924 B2 | | 12/2002 | Das | 29/596 |
| 2002/0175644 A1 | | 11/2002 | Su | 318/254 |

FOREIGN PATENT DOCUMENTS

WO    WO 98/08291    2/1998

* cited by examiner

*Primary Examiner*—Rita Leykin
(74) *Attorney, Agent, or Firm*—McDermott Will & Emery LLP

(57) ABSTRACT

A multiphase motor has a plurality of ferromagnetically isolated stator electromagnets distributed about an axis of rotation. Successive ranges of speed during which the motor can be expected to operate are defined. A specific subset of the electromagnets is associated for each speed range, each specific subset comprising a different combination of electromagnets. Respective voltage magnitudes to be applied to each phase winding for each defined speed range are predefined. The motor speed is sensed throughout motor operation. In each defined speed range, only the electromagnets of the associated subset are energized, each of the energized electromagnets having applied thereto a different predefined voltage magnitude.

21 Claims, 6 Drawing Sheets

| PHASE WINDING | WIRE GAUGE | NUMBER OF TURNS |
|---|---|---|
| 38a | 22 | 670 |
| 38c | 21 | 560 |
| 38e | 20 | 460 |
| 38g | 19 | 370 |
| 38b | 18 | 290 |
| 38d | 17 | 220 |
| 38f | 16 | 160 |

Fig. 3

MULTIPHASE MOTOR VOLTAGE CONTROL FOR PHASE WINDINGS OF DIFFERENT WIRE GAUGES AND WINDING TURNS

RELATED APPLICATIONS

This application contains subject matter related to U.S. application Ser. No. 09/826,423 of Boris Maslov et al., filed Apr. 5, 2001, now U.S. Pat. No. 6,492,756, issued Dec. 10, 2002; copending U.S. application Ser. No. 09/826,422 of Boris Maslov et al., filed Apr. 5, 2001, copending U.S. application Ser. No. 10/173,610 of Boris Maslov et al., filed Jun. 19, 2002, now U.S. Pat. No. 6,727,668, issued Apr. 27, 2004; U.S. application Ser. No. 10/290,505, of Boris Maslov et al., filed Nov. 8, 2002, and U.S. application Ser. No. 10/352,897, filed Jan. 29, 2003, all commonly assigned with the present application. The disclosures of these applications are incorporated by reference herein.

FIELD OF THE INVENTION

The present invention relates to the control of a multiphase motor, more particularly to the application of different voltages to individual phase windings of differing winding and wire gauge topologies through a succession of motor operating speed ranges.

BACKGROUND

The progressive improvement of electronic systems, such as microcontroller and microprocessor based applications for the control of motors, as well as the availability of improved portable power sources, has made the development of efficient electric motor drives for vehicles, as a viable alternative to combustion engines, a compelling challenge. Electronically controlled pulsed energization of windings of motors offers the prospect of more flexible management of motor characteristics. By control of pulse width, duty cycle, and switched application of a battery source to appropriate stator windings, functional versatility that is virtually indistinguishable from alternating current synchronous motor operation can be achieved.

The above-identified copending related U.S. patent application of Maslov et al., application Ser. No. 09/826,423, identifies and addresses the need for an improved motor amenable to simplified manufacture and capable of efficient and flexible operating characteristics. In a vehicle drive environment, it is highly desirable to attain smooth operation over a wide speed range, while maintaining a high torque output capability at minimum power consumption. The copending related U.S. application incorporates electromagnet poles as isolated magnetically permeable structures configured as segments in an annular ring, relatively thin in the radial direction, to provide advantageous effects. With this arrangement, flux can be concentrated, with virtually no loss or deleterious transformer interference effects in the electromagnet cores, as compared with prior art embodiments.

The Maslov et al. applications recognize that isolation of the electromagnet segments permits individual concentration of flux in each magnetic core segment, with virtually no flux loss or deleterious transformer interference effects from flux interaction with other core segments. Operational advantages can be gained by configuring a single pole pair as an autonomous electromagnet. Magnetic path isolation of the individual pole pair from other pole pairs eliminates a flux transformer effect on an adjacent group when the energization of the pole pair windings is switched.

The above-identified copending U.S. patent application Ser. No. 10/173,610 is directed to a control system for a multiphase motor having these structural features. A control strategy is described that compensates for individual phase circuit characteristics and offers a higher degree of precision controllability since each phase control loop is closely matched with its corresponding winding and structure. Control parameters are specifically matched with characteristics of each respective stator phase. Successive switched energization of each phase winding is governed by a controller that generates signals in accordance with the parameters associated with the stator phase component for the phase winding energized.

While the motors described in the above-identified applications provide operational advantages, these motors and prior art motors do not exhibit uniformly high efficiency at all speeds of a wide operating speed range, even with non-variable loads. For a fixed motor topology, the available magnetomotive force (MMF) is dependent upon the number of winding turns and energization current The term "motor topology" is used herein to refer to physical motor characteristics, such as dimensions and magnetic properties of stator cores, the number of coils of stator windings and wire diameter (gauge), etc. The available magnetomotive force dictates a variable, generally inverse, relationship between torque and speed over an operating range. An applied energization current may drive the motor to a nominal operating speed. As the motor accelerates toward that speed, the torque decreases, the current drawn to drive the motor decreases accordingly, and thus efficiency increases to a maximum level. As speed increases beyond the level of peak efficiency, additional driving current is required, thereby sacrificing efficiency thereafter. Thus, efficiency is variable throughout the speed range and approaches a peak at a speed well below maximum speed.

Motors with different topologies obtain peak efficiencies at different speeds, as illustrated in FIG. 1. This figure is a plot of motor efficiency versus operating speed over a wide speed range for motors having different topologies. The topologies represented in this figure differ solely in the number of stator winding turns. Each efficiency curve approaches a peak value as the speed increases from zero to a particular speed and then decreases toward zero efficiency. Curve A, which represents the motor with the greatest number of winding turns, exhibits the steepest slope to reach peak efficiency at the earliest speed V2. Beyond this speed, however, the curve exhibits a similarly steep negative slope. Thus, the operating range for this motor is limited. The speed range window at which this motor operates at or above an acceptable level of efficiency, indicated as X% in FIG. 1, is relatively narrow.

Curves B through E represent motors with successively fewer winding turns. As the number of winding turns decreases, the motor operating speed for maximum efficiency increases. Curve B attains peak efficiency at speed V3, Curve C at V4, Curve D at V5 and Curve E at V6. Each motor has peak efficiency at a different motor operating speed, and none has acceptable efficiency over the entire range of motor operating speeds.

In motor applications in which the motor is to be driven over a wide speed range, such as in a vehicle drive environment, FIG. 1 indicates that there is no ideal single motor topology that will provide uniformly high operating efficiency over the entire speed range. For example, at speeds above V6 curves A and B indicate zero efficiency. At the lower end of the speed range, for example up to V2, curves C through E indicate significantly lower efficiency than curves A and B.

In motor vehicle drives, operation efficiency is particularly important as it is desirable to extend battery life and thus the time period beyond which it becomes necessary to recharge or replace an on-board battery. The need thus exists for motors that can operate with more uniformly high efficiency over a wider speed range than those presently in use. This need is addressed in U.S. application Ser. No. 10/290,505. The approach taken therein is to change, on a dynamic basis, the number of active coils of each stator winding for each of a plurality of speed ranges between startup and a maximum speed at which a motor can be expected to operate. The speed ranges are identified in a manner similar to that illustrated in FIG. 1 and a different number of the motor stator winding coils that are to be energized are designated for each speed range to obtain maximum efficiency for each of a plurality of operating speed ranges. The number of energized coils is changed when the speed crosses a threshold between adjacent speed ranges. Each winding comprises a plurality of individual, serially connected, coil sets separated by tap connections. Each respective tap is connected by a switch to a source of energization during a single corresponding speed range. The windings thus have a different number of energized coils for each speed range.

While this arrangement expands the speed range in which high efficiency may be obtained, the inductive characteristics of the motor windings require precisely timed connection and disconnection of the taps to and from the power source. A significant amount of electronic power circuitry and control circuitry therefor must be provided to obtain accurate functionality. Structural constraints in particular motor configurations may limit the number of taps, and thus coil sets, that are available from individual stator windings.

The need thus remains for alternative ways in which high efficiency motor operation can be obtained over extended speed ranges. This need is addressed in above-identified copending Gladkov Application Ser. No. 10/352,897. That application describes motor structure in which each stator phase winding is configured with a topology different from the topology of each of the other phase windings. Winding topology is characterized by the total number of coil turns in each phase winding and the wire gauge of the coil in each phase winding. Each phase winding differs from each of the other phase windings by the total number of coil turns or by wire gauge, preferably in both respects. With the gauge sizes and total number of coil turns of the phase windings being in inverse relationship with respect to each other, all of the phase windings are provided with substantially the same total coil mass. Phase winding energization can be tailored to obtain maximum efficiency in each of several operating speed ranges from statup to the maximum speed at which a motor can be expected to operate.

The need exists to provide the optimal voltage to be applied to each phase winding at each operating speed range. For a machine structure that accommodates a large number of phases, it is necessary to predefine for each speed range which phase windings are to have no voltage applied as well as to identify what predefined voltage magnitude is to be applied to each of the remaining phase windings. The number of, and identity of, the phase windings that are to be energized, as well as the magnitude of the individually applied predefined voltages, may differ for each speed range. The predefined optimal voltages should be applied on a dynamic basis in accordance with the sensed speed of the motor.

While the predefined voltages for the phase windings can be derived to provide optimal efficiency over the entire motor operating speed range for a given torque, many motor applications exist which require control for variable motor speed, such as in motor vehicles. Motor output torque should be adjusted in accordance with a user's input command related to desired speed. The further need thus exists for developing applied phase winding voltages that optimize efficiency throughout the operating speed range at variable torque output in accordance with user command.

DISCLOSURE OF THE INVENTION

The present invention fulfills the above-described needs for controlling, through a plurality of operating speed ranges, a multiphase motor having a plurality of ferromagnetically isolated stator electromagnets distributed about an axis of rotation, each electromagnet having a phase winding formed on a ferromagnetic core. Successive ranges of speed during which the motor can be expected to operate are defined. A specific subset of the electromagnets is associated for each speed range, each specific subset comprising a different combination of electromagnets. Respective voltage magnitudes to be applied to each phase winding for each defined speed range are predefined. The motor speed is sensed throughout motor operation. In each defined speed range, only the electromagnets of the associated subset are energized, each of the energized electromagnets having applied thereto a different predefined voltage magnitude.

The present invention is particularly advantageous in that the different phase winding topologies of the electromagnets, wherein each phase winding has a different total number of coil turns and a different wire gauge from each of the other phase windings, permits division of the entire operating speed range into many narrow ranges in which fine adjustment for efficiency can be obtained. During operation in each defined speed range at least one of the total number of electromagnet phase windings may be deenergized.

Phase windings that are energized with specified predefined voltages during one speed range may also be energized, with different predefined voltages, during another defined speed range. The number and identity of phase windings energized during one defined speed range may be different from the number and identity of phase windings energized during another defined speed range.

A further advantage of the present invention is that the predefined voltage magnitudes for all speed ranges can be set for maximum motor torque output. Adjustment of the predefined voltage magnitudes can be made in accordance with a user torque input command to obtain optimal motor drive efficiency at other torque outputs. The user torque input command can vary through a range between zero torque and maximum torque. By relating the range of the user input to a fractional value that is variable between zero and one, the control system can multiply the predefined maximum torque voltage magnitudes for all speed ranges by the fractional value corresponding to the user input to obtain optimal motor drive efficiency at all torque outputs.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which:

FIG. 3 is a chart exhibiting wire gauges and total number of winding turns for each phase of a multiphase motor exemplifying the present invention.

DETAILED DESCRIPTION OF THE INVENTION

Figure 2:
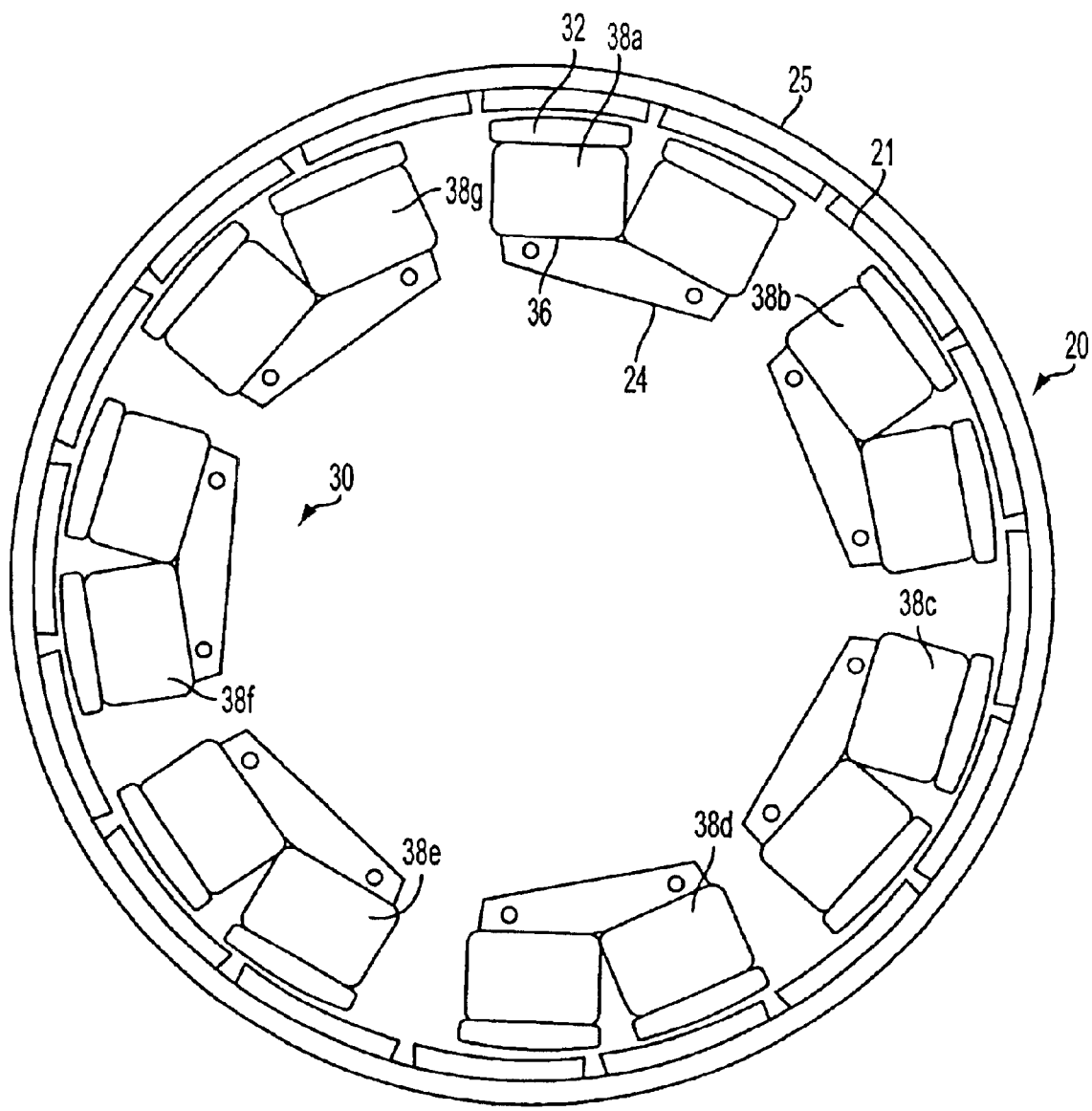
FIG. 2 is an exemplary configuration of rotor and stator elements that may be employed in the present invention.

FIG. 2 is an exemplary configuration of rotor and stator elements that may be employed in the present invention. Reference is made to the above identified copending Maslov et al. application Ser. No. 09/826,422 for a more detail description of the motor exemplified herein. Rotor member 20 is an annular ring structure having permanent magnets 21 spaced from each other and substantially evenly distributed along cylindrical back plate 25. The permanent magnets are rotor poles that alternate in magnetic polarity along the inner periphery of the annular ring. The rotor surrounds a stator member 30, the rotor and stator members being separated by an annular radial air gap. Stator 30 comprises a plurality of electromagnet core segments of uniform construction that are evenly distributed along the air gap.

The stator comprises seven core segments, each core segment formed in a generally u-shaped magnetic structure 36 with two poles having surfaces 32 facing the air gap. The legs of the pole pairs are wound with windings 38, although the core segment may be constructed to accommodate a single winding formed on a portion linking the pole pair. Each stator electromagnet core structure is separate, and magnetically isolated, from adjacent stator core elements. Each of the core segments can be considered to represent a phase, the phase windings identified successively along the air gap by labels 38a–38g. The stator elements 36 are secured to a non-magnetically permeable support structure, thereby forming an annular ring configuration. This configuration eliminates emanation of stray transformer flux effects from adjacent stator pole groups. Appropriate stator support structure, which has not been illustrated herein so that the active motor elements are more clearly visible, can be seen in the aforementioned patent application.

Windings 38a–38g differ from each other in winding topology with respect to wire gauges and total number of winding coil turns. While it is preferable in this embodiment that each phase winding has a unique number of total winding turns and a unique wire gauge, two or more phase windings may have similar wire gauges or number of turns. Other embodiments may comprise a greater number of isolated core segment pole pairs. It may be preferable in such embodiments that some phase windings have the same winding topology.

FIG. 3 is a chart exemplifying phase winding topologies for a seven phase motor illustrated in FIG. 2. Each phase winding has a unique number of coil turns and is constructed of a unique wire gauge. The total copper mass of each of the phase windings is the same.

Figure 4:
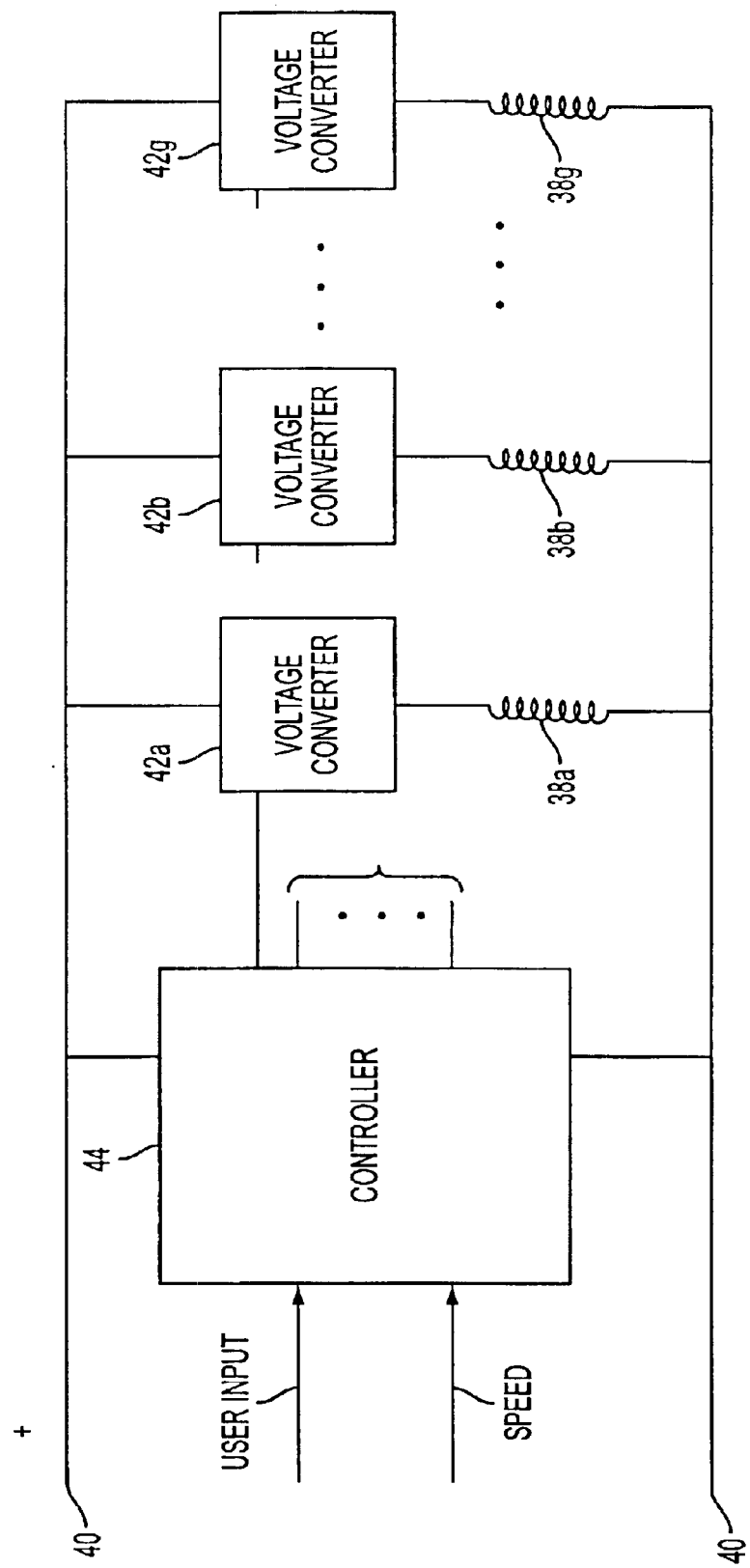
FIG. 4 is a partial block diagram of a voltage supply circuit for the motor of FIG. 2.

FIG. 4 is a partial block diagram of a voltage supply circuit for the motor of FIG. 2. Phase windings 38a–38g are connected to d-c power supply 40 via a series connection, respectively, with voltage converters 42a–42g. A control terminal of each voltage converter is coupled to controller 44, which is also connected across power supply 40. The controller and voltage converters are conventional devices as described more filly in the copending Maslov et al. application Ser. No. 10/173,610. The controller 44, which may comprise a microprocessor and associated storage means, may have one or more user inputs and a plurality of inputs for motor conditions sensed during operation. For clarity of explanation of the present invention, a motor speed input is the only motor condition feedback input shown. The speed input signal may be generated by any conventional motor speed sensor. Stored in the controller is a table that identifies a voltage level to be applied to each phase winding for each of a plurality of speed ranges over the operating range. Voltage values that have been found to provide maximum operating efficiency at maximum motor torque output for each of the phase windings 38a–38g in various speed ranges are identified in the table below. The efficiency of operation for each range is also set forth in the table.

TABLE

| RPM | Voltage for phase winding 38a | Voltage for phase winding 38c | Voltage for phase winding 38e | Voltage for phase winding 38g | Voltage for phase winding 38b | Voltage for phase winding 38d | Voltage for phase winding 38f | Efficiency |
|---|---|---|---|---|---|---|---|---|
| 0 | 24.0 | 16.3 | 10.8 | 6.8 | 0.0 | 0.0 | 0.0 | 0.0 |
| 10 | 24.0 | 16.4 | 10.9 | 6.9 | 0.0 | 0.0 | 0.0 | 13.3 |
| 20 | 24.0 | 16.7 | 11.2 | 7.2 | 0.0 | 0.0 | 0.0 | 26.1 |
| 30 | 24.0 | 17.1 | 11.7 | 7.6 | 0.0 | 0.0 | 0.0 | 38.1 |
| 40 | 24.0 | 17.8 | 12.4 | 8.1 | 0.0 | 0.0 | 0.0 | 49.1 |
| 50 | 24.0 | 18.6 | 13.3 | 8.9 | 0.0 | 0.0 | 0.0 | 59.0 |
| 60 | 24.0 | 19.6 | 14.4 | 9.8 | 0.0 | 0.0 | 0.0 | 67.6 |
| 70 | 24.0 | 20.8 | 15.7 | 10.8 | 0.0 | 0.0 | 0.0 | 74.6 |
| 80 | 24.0 | 22.2 | 17.2 | 12.1 | 0.0 | 0.0 | 0.0 | 79.3 |
| 90 | 24.0 | 23.8 | 18.9 | 13.5 | 0.0 | 0.0 | 0.0 | 80.9 |
| 100 | 0.0 | 24.0 | 20.8 | 15.0 | 0.0 | 0.0 | 0.0 | 83.5 |
| 110 | 0.0 | 24.0 | 22.9 | 16.7 | 0.0 | 0.0 | 0.0 | 83.2 |
| 120 | 0.0 | 0.0 | 24.0 | 18.6 | 12.7 | 0.0 | 0.0 | 84.1 |

TABLE-continued

| RPM | Voltage for phase winding 38a | Voltage for phase winding 38c | Voltage for phase winding 38e | Voltage for phase winding 38g | Voltage for phase winding 38b | Voltage for phase winding 38d | Voltage for phase winding 38f | Efficiency |
|---|---|---|---|---|---|---|---|---|
| 130 | 0.0 | 0.0 | 24.0 | 20.7 | 14.1 | 0.0 | 0.0 | 86.2 |
| 140 | 0.0 | 0.0 | 24.0 | 22.9 | 15.8 | 0.0 | 0.0 | 84.3 |
| 150 | 0.0 | 0.0 | 0.0 | 24.0 | 17.5 | 0.0 | 0.0 | 84.5 |
| 160 | 0.0 | 0.0 | 0.0 | 24.0 | 19.3 | 0.0 | 0.0 | 86.8 |
| 170 | 0.0 | 0.0 | 0.0 | 24.0 | 21.3 | 14.0 | 0.0 | 85.6 |
| 180 | 0.0 | 0.0 | 0.0 | 24.0 | 23.4 | 15.5 | 0.0 | 82.8 |
| 190 | 0.0 | 0.0 | 0.0 | 0.0 | 24.0 | 17.0 | 0.0 | 85.0 |
| 200 | 0.0 | 0.0 | 0.0 | 0.0 | 24.0 | 18.6 | 0.0 | 87.7 |
| 210 | 0.0 | 0.0 | 0.0 | 0.0 | 24.0 | 20.3 | 0.0 | 87.4 |
| 220 | 0.0 | 0.0 | 0.0 | 0.0 | 24.0 | 22.1 | 0.0 | 84.4 |
| 230 | 0.0 | 0.0 | 0.0 | 0.0 | 24.0 | 23.9 | 15.3 | 80.5 |
| 240 | 0.0 | 0.0 | 0.0 | 0.0 | 0.0 | 24.0 | 16.6 | 84.9 |
| 250 | 0.0 | 0.0 | 0.0 | 0.0 | 0.0 | 24.0 | 18.0 | 87.9 |
| 260 | 0.0 | 0.0 | 0.0 | 0.0 | 0.0 | 24.0 | 19.4 | 88.6 |
| 270 | 0.0 | 0.0 | 0.0 | 0.0 | 0.0 | 24.0 | 20.8 | 87.2 |
| 280 | 0.0 | 0.0 | 0.0 | 0.0 | 0.0 | 24.0 | 22.3 | 84.0 |
| 290 | 0.0 | 0.0 | 0.0 | 0.0 | 0.0 | 24.0 | 23.9 | 79.7 |
| 300 | 0.0 | 0.0 | 0.0 | 0.0 | 0.0 | 0.0 | 24.0 | 81.9 |
| 310 | 0.0 | 0.0 | 0.0 | 0.0 | 0.0 | 0.0 | 24.0 | 84.6 |
| 320 | 0.0 | 0.0 | 0.0 | 0.0 | 0.0 | 0.0 | 24.0 | 87.4 |
| 330 | 0.0 | 0.0 | 0.0 | 0.0 | 0.0 | 0.0 | 24.0 | 90.1 |
| 340 | 0.0 | 0.0 | 0.0 | 0.0 | 0.0 | 0.0 | 24.0 | 92.8 |
| 350 | 0.0 | 0.0 | 0.0 | 0.0 | 0.0 | 0.0 | 24.0 | |
| 360 | 0.0 | 0.0 | 0.0 | 0.0 | 0.0 | 0.0 | 24.0 | |

In operation, the controller 44 accesses data from the table to determine which phase windings are to be energized at startup and the level of voltage to be applied to each phase winding. The controller outputs the appropriate control voltages for these values to the respective voltage converters connected to the phase windings. As the motor accelerates, motor speed is repetitively sampled and fed as a signal input to the controller. In response to the received speed input signal, the controller accesses the stored table to receive voltage data for each phase winding at the speed range in which the sensed speed is located. New control signals, corresponding to the accessed data, are output to the voltage converters to change, if appropriate, the voltages applied to the phase windings. As motor load varies, the motor speed may vary accordingly. The controller, in turn, will adjust its output control voltages for these changes as provided by the table thereby to maintain optimum operation efficiency over the entire operating speed range.

Figure 5:
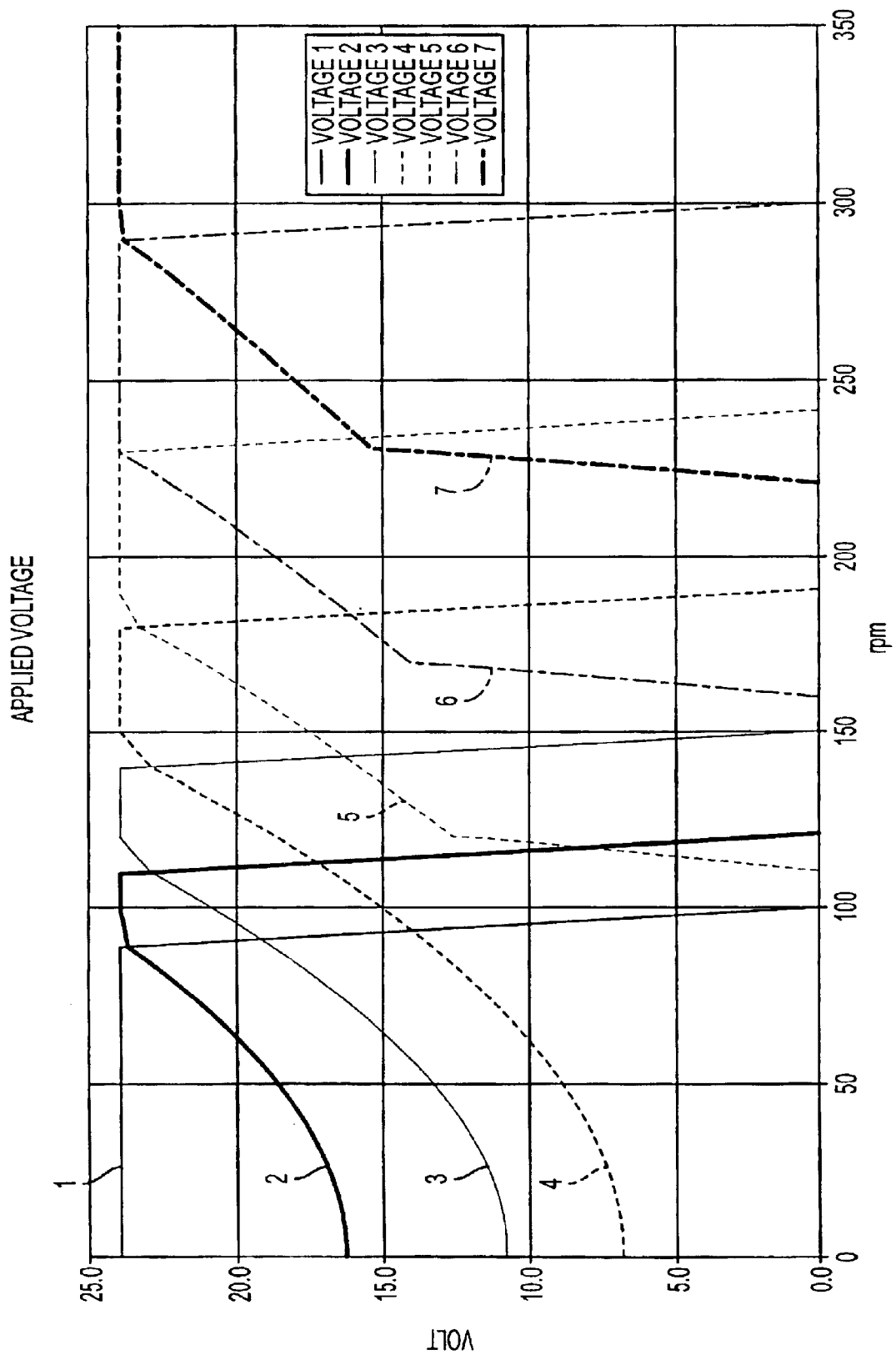
FIG. 5 is an exemplary plot of voltage applied to each phase winding of the motor of FIG. 2 over the operating speed range.

The table represents a speed operating range of 360 rpm that is very finely divided for application of precisely adjusted voltage levels. This information is provided in graphic form in FIG. 5, each curve representing voltages applied to a respective phase winding throughout the range. Curve 1 represents voltages applied to phase winding 38a; curve 2 represents voltages applied to phase winding 38c; curve 3 represents voltages applied to phase winding 38e; curve 4 represents voltages applied to phase winding 38g; curve represents voltages applied to phase winding 38b; curve 6 represents voltages applied to phase winding 38d; and curve 7 represents voltages applied to phase winding 38f.

During different portions of the operational speed range, different combinations of phase windings will be energized. At no time are all seven phase windings energized. As evident from the table and FIG. 5, at starting, four phase windings are energized with changing voltage levels as shown up to speed of 100 rpm. For speeds between 100 and 140 rpm, three phase windings are energized with voltage levels as shown; between 140 and 160 rpm. two phase windings are energized; between 160 and 180 rpm. three phase windings are energized; between 180 and 220 rpm. two phase windings are energized; between 220 to 230 three windings are energized; between 230 and 290 two phase windings are energized; and at speeds greater than 290 only a single winding is energized. For each of these ranges, different combinations of energized phase windings are identified and are to be supplied with different energization voltages.

Figure 1:
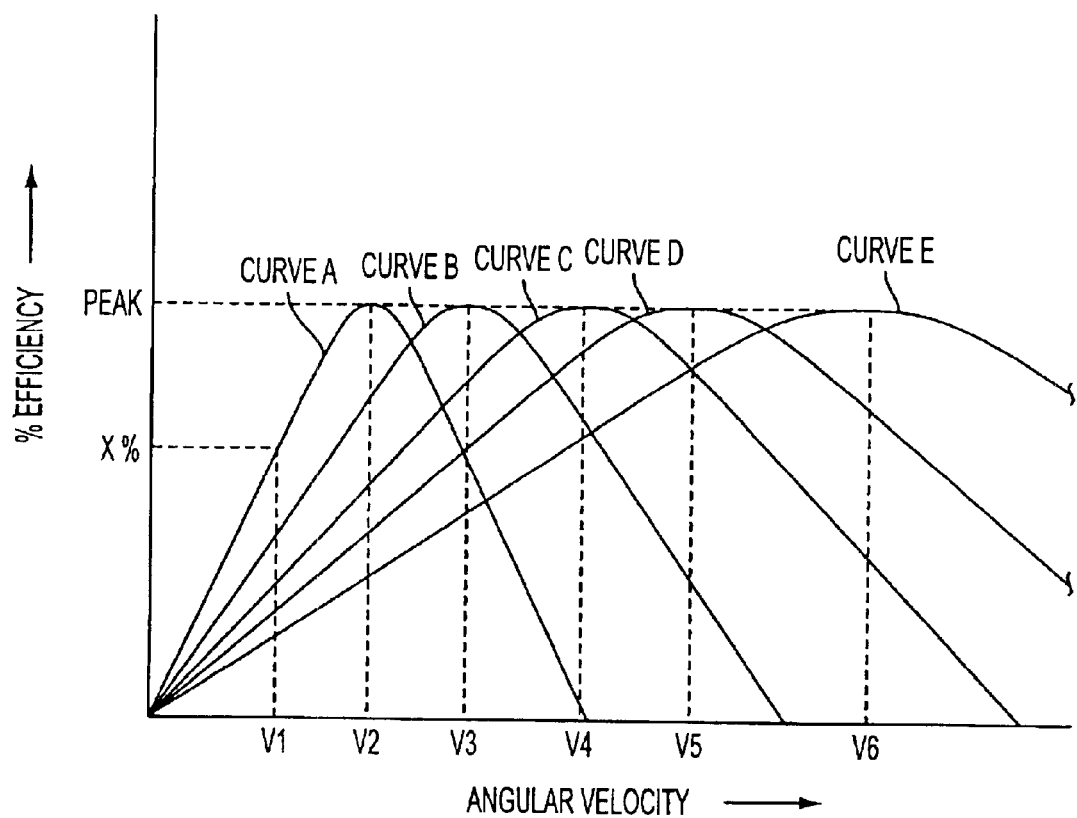
FIG. 1 is a plot of motor efficiency versus motor operating speed over a wide speed range for different conventional motors having different numbers of winding turns.
Figure 6:
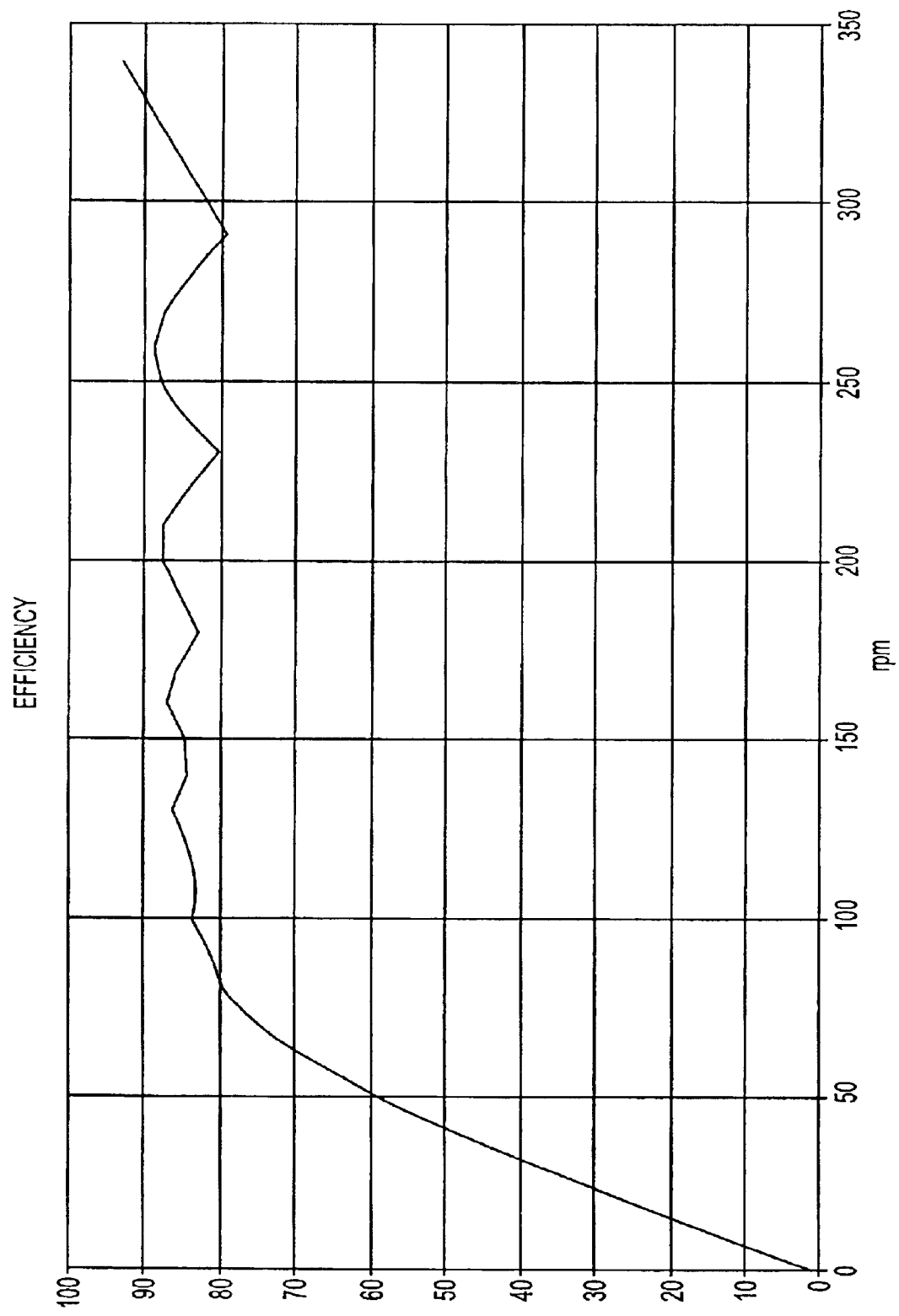
FIG. 6 is a plot of motor efficiency versus motor operating speed for voltages applied in accordance with FIG. 5.

Motor efficiency for operation in accordance with the table over the entire speed range is illustrated graphically in FIG. 6. Comparison of this curve with the efficiency curves of conventionally operated motors, shown in FIG. 1, illustrates the improved operating efficiency of the present invention. The stator winding configuration of the present invention, when energized in accordance with the voltages indicated in the table over the motor operating range, provides a motor operating efficiency in excess of eighty per cent over approximately three quarters of the speed range.

The controller user input illustrated in FIG. 4 represents a torque command signal, such as described in the above-identified U.S. patent application Ser. No. 10/173,610. A vehicle drive application example is described therein, the user input representing desired torque indicated by the user's throttle command. The user may vary the throttle between zero and a maximum level. An increase in throttle is indicative of a command to increase speed, which is realized by an increase in torque. Description of to this point of the motor operation has focussed on control at maximum motor torque output, for which the corresponding user input represents maximum throttle.

The variable user torque input command range is related to a fractional value that is variable between zero for a zero torque input command and one for maximum torque input command. Motor speed is repetitively sampled and fed as a signal input to the controller. The controller, in response to the sensed speed signal input will access stored data stored representing the voltage magnitude values in the table and multiply these voltage magnitude values by the fractional value that corresponds to the user torque input command setting. As speed signals for different speed ranges are received, the appropriate voltage magnitude values are obtained from the table and new control signals, which are products of these voltage magnitudes and the fractional value for the user input command are produced. For the set user input command, optimal motor drive efficiency is achieved for all speed ranges. Maximum operational efficiency is similarly obtained for all set user torque inputs for all speed ranges.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, as can be appreciated, motor topologies can vary significantly for different numbers of poles, pole dimensions and configurations,pole compositions, etc. Different numbers of coil sets and speed range subsets can be chosen to suit particular topologies. Instead of winding each stator core segment with wires of different gauges, the number of turns on each stator core segment can be varied with all wire being of the same gauge. The configuration of the coil sections may be varied to meet optimum efficiency curves for different topologies. Threshold levels may be adjusted to increase and/or decrease one or more speed ranges, thus setting a more even or uneven speed range subset distribution.

What is claimed is:

1. A method for controlling, through a plurality of operating speed ranges, a multiphase motor comprising a total number of ferromagnetically isolated stator electromagnets distributed about an axis of rotation, each electromagnet having a phase winding formed on a ferromagnetic core, the method comprising the steps of:
   identifying specific ones of a first number of the electromagnets, the first number being smaller than the total number;
   energizing the phase winding of each of the identified electromagnets with a different predefined voltage magnitude for motor operation during a first speed range;
   sensing the motor speed throughout motor operation; and
   during operation of the motor at a sensed second speed range, applying to the phase windings of the identified electromagnets voltages that are of different predefined magnitudes than the voltages applied during the first speed range.

2. A method as recited in claim 1, further comprising the step of:
   applying predefined voltages to phase windings of a second number of the electromagnets during operation of the motor at a sensed third speed range, the magnitudes of the voltages applied to each of these windings during this step being different from each other.

3. A method as recited in claim 1, wherein the second number is smaller than the first number.

4. A method as recited in claim 3, wherein the identity of the phase windings energized during the third speed range are in common with phase windings energized during the first and second speed ranges and the voltages applied to each phase winding during the third speed range differ in magnitude from the voltages applied to the respective phase windings during the first and second speed ranges.

5. A method for controlling, through a plurality of operating speed ranges, a multiphase motor comprising a total number of ferromagnetically isolated stator electromagnets distributed about an axis of rotation, each electromagnet having a phase winding formed on a ferromagnetic core, the method comprising the steps of:
   defining successive ranges of speed during which the motor can be expected to operate;
   associating a specific subset of the total number of electromagnets for each speed range, each specific subset comprising a different combination of electromagnets;
   predefining respective voltage magnitudes for each phase winding for each defined speed range;
   sensing the motor speed throughout motor operation; and
   during operation of the motor in each defined speed range, energizing only the electromagnets of the associated subset, each of the energized electromagnets having applied thereto a different predefined voltage magnitude.

6. A method as recited in claim 5, wherein during operation in each defined speed range at least one of the total number of electromagnet phase windings is deenergized.

7. A method as recited in claim 5, wherein at least one of the phase windings energized during a first defined speed range is also energized during a second defined speed range, a different predetermined magnitude of voltage being applied thereto in each speed range.

8. A method as recited in claim 7, wherein the number of phase windings energized during the first defined speed range is different from the number of phase windings energized during the second defined speed range.

9. A method as recited in claim 5, wherein the number of phase windings energized during a first defined speed range is different from the number of phase windings energized during a second defined speed range.

10. A method as recited in claim 5, further comprising the step of adjusting the predefined voltage magnitudes for all of the phase windings in response to a user command.

11. A method as recited in claim 10, wherein the user command represents a motor torque request, the predefined voltage magnitudes represent motor operation at a set torque, and the step of adjusting comprises multiplying the predefined voltage magnitudes by a value dependent on desired torque.

12. A method as recited in claim 11, wherein the set torque is maximum motor torque and the adjustment multiplier is a fractional value between zero and one.

13. A method as recited in claim 5, wherein each phase winding has a different total number of coils from each of the other phase windings.

14. A method as recited in claim 5, wherein each phase winding has a different wire gauge from the wire gauge of each of the other phase windings.

15. A motor control system comprising:
   a multiphase motor comprising a total number of ferromagnetically isolated stator electromagnets distributed about an axis of rotation, each electromagnet having a phase winding formed on a ferromagnetic core;
   voltage conversion means connected between each phase winding and a power supply for applying any of a plurality of voltage magnitudes to the phase windings;
   a controller coupled to the voltage conversion means, the controller comprising memory means for storing data relating voltage magnitudes to motor speed operating ranges for each of the electromagnet phase windings; and
   motor speed feedback means coupled to an input of the controller.

16. A motor control system as recited in claim 15, wherein the stored data represents a table that identifies a specific subset of the total number of electromagnets to be energized for each of a plurality of speed ranges, each specific subset comprising a different combination of electromagnets.

17. A motor control system as recited in claim 16, wherein each phase winding has a different total number of coil turns from each of the other phase windings.

18. A motor control system as recited in claim 17, wherein each phase winding has a different wire gauge from the wire gauge of each of the other phase windings.

19. A motor control system as recited in claim 16, wherein the voltage magnitudes stored in the table are different for each of the energized electromagnets identified in each speed range.

20. A motor control system as recited in claim 19, wherein the total number of electromagnets is odd and the table indicates zero voltage for at least one of the phases for each speed range.

21. A motor control system as recited in claim 19, wherein the voltage magnitudes stored in the table represent motor operation at maximum torque and the controller further comprises a user input that represents a motor torque request; and in response to a user input signal during motor operation, the controller multiplies the stored voltage magnitudes by a corresponding fractional value for application to the phase windings.

\* \* \* \* \*